US010776222B2

United States Patent
Fricker (10) Patent No.: US 10,776,222 B2
(45) Date of Patent: *Sep. 15, 2020

(54) ASYMMETRIC MEMORY TRANSCEIVER (71) Applicant: EMC IP Holding Company LLC, Hopkinton, MA (US)

(72) Inventor: Jean-Philippe Fricker, Mountain View, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/257,191

(22) Filed: Jan. 25, 2019

(65) Prior Publication Data

US 2019/0155702 A1 May 23, 2019

Related U.S. Application Data (63) Continuation of application No. 15/865,199, filed on Jan. 8, 2018, now Pat. No. 10,235,253, which is a (Continued)

(51) Int. Cl.
*G06F 11/14* (2006.01)
*G06F 12/0831* (2016.01)
*G06F 3/06* (2006.01)

(52) U.S. Cl.
CPC .......... *G06F 11/1469* (2013.01); *G06F 3/065* (2013.01); *G06F 3/067* (2013.01);
(Continued)

(58) Field of Classification Search
CPC ........ G06F 3/065; G06F 3/0619; G06F 3/067; G06F 2201/84; G06F 11/1451;
(Continued)

(56) References Cited

U.S. PATENT DOCUMENTS 6,154,587 A  11/2000 Okayama
7,743,211 B2  6/2010 Fujimoto et al.
(Continued)

FOREIGN PATENT DOCUMENTS

CN    1619478 A    5/2005
CN    1836400 A    9/2006
CN   105099423 A   11/2015

OTHER PUBLICATIONS

Notification of First Office Action issued in corresponding Chinese Application No. 201610197408.1, dated Apr. 29, 2019.

*Primary Examiner* — Hua J Song
(74) *Attorney, Agent, or Firm* — Chamberlain, Hrdlicka, White, Williams & Aughtry (57) ABSTRACT A system for transmission of memory entries. The system includes a computing device that includes a memory module, a memory controller interfacing with the memory module via a memory bus, a snooping module interfacing with the memory bus, functionally in parallel to the memory module, and a high-speed interconnect, functionally connecting the snooping module to a receiving device. The memory controller is configured to write a memory entry to the memory module via the memory bus. The snooping module is configured to capture a copy of the memory entry being written to the memory module and to send the copy of the memory entry to the receiving device, via the high-speed interconnect.

19 Claims, 7 Drawing Sheets

Related U.S. Application Data continuation of application No. 14/979,218, filed on Dec. 22, 2015, now Pat. No. 9,898,375.

(52) U.S. Cl.
CPC ........ G06F 3/0619 (2013.01); G06F 11/1435 (2013.01); G06F 11/1451 (2013.01); G06F 12/0833 (2013.01); G06F 12/0835 (2013.01); G06F 2201/84 (2013.01)

(58) Field of Classification Search
CPC ............. G06F 11/1435; G06F 11/1469; G06F 12/0833; G06F 12/0835
USPC ......................................................... 711/162
See application file for complete search history.

(56) References Cited

U.S. PATENT DOCUMENTS

| | | | |
|---|---|---|---|
| 7,746,799 | B2 | 6/2010 | Kokot et al. |
| 8,667,110 | B2 | 3/2014 | Groenendaal et al. |
| 9,077,338 | B1 | 7/2015 | Schulz et al. |
| 9,529,545 | B1 | 12/2016 | Bono et al. |
| 9,576,165 | B2 | 2/2017 | Curren et al. |
| 9,779,016 | B1 * | 10/2017 | Shen .................. G06F 1/30 |
| 9,898,375 | B1 | 2/2018 | Fricker |
| 2001/0046348 | A1 | 11/2001 | Sarkimukka et al. |
| 2009/0166423 | A1 | 7/2009 | Dischamp et al. |
| 2010/0122107 | A1 | 5/2010 | Arimilli et al. |
| 2012/0284435 | A1 | 11/2012 | Myrah et al. |
| 2013/0129345 | A1 | 5/2013 | Meng et al. |
| 2013/0166813 | A1 | 6/2013 | Chandra et al. |
| 2013/0259465 | A1 | 10/2013 | Blair |
| 2013/0268714 | A1 | 10/2013 | Brundridge et al. |
| 2016/0188472 | A1 | 6/2016 | Forrest et al. |

* cited by examiner

ASYMMETRIC MEMORY TRANSCEIVER

BACKGROUND

Processors of computing devices may rely on memory, e.g., random-access memory, to rapidly access data. Memory content may be copied if the memory content is required elsewhere and/or to generate backup copies.

BRIEF DESCRIPTION OF DRAWINGS

FIGS. 3-6B show flowcharts in accordance with one or more embodiments of the technology.

DETAILED DESCRIPTION

Specific embodiments of the technology will now be described in detail with reference to the accompanying figures. Like elements in the various figures are denoted by like reference numerals for consistency.

In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6B, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology are directed to asymmetric memory transceivers. More specifically, one or more embodiments disclosed herein may be directed to asymmetric memory transceivers capable of reading in near-real-time from a computing device's memory when the content of the memory is updated, for example, when a central processing unit (CPU) writes to the memory. The asymmetric memory transceiver may forward the data, written by the CPU, to a persistent storage, where it may be archived. In one embodiment of the technology, the archived memory content may be used at a later time to restore the state of the memory, if necessary. Restoration of the state of the memory may become necessary, for example, after a power failure, a memory chip failure, or other types of errors.

In one embodiment of the technology, the reading of the computing device's memory may occur in near-real-time, i.e. the asymmetric memory transceiver is capable of capturing memory entries as they are written to the memory. In contrast, the writing to the memory, e.g. to restore the state of the memory after an error, may be considerably slower. The memory transceiver may therefore perform asymmetrically.

Asymmetric memory transceivers, in accordance with an embodiment of the technology may also be used to establish memory-to-memory data exchange, for example, between memory of different CPUs. The asymmetric memory transceiver may forward the data written to the memory affiliated with a first CPU to a second memory transceiver, interfacing with the memory affiliated with a second CPU. The receiving memory transceiver may then update the memory affiliated with the second CPU.

Figure 1:
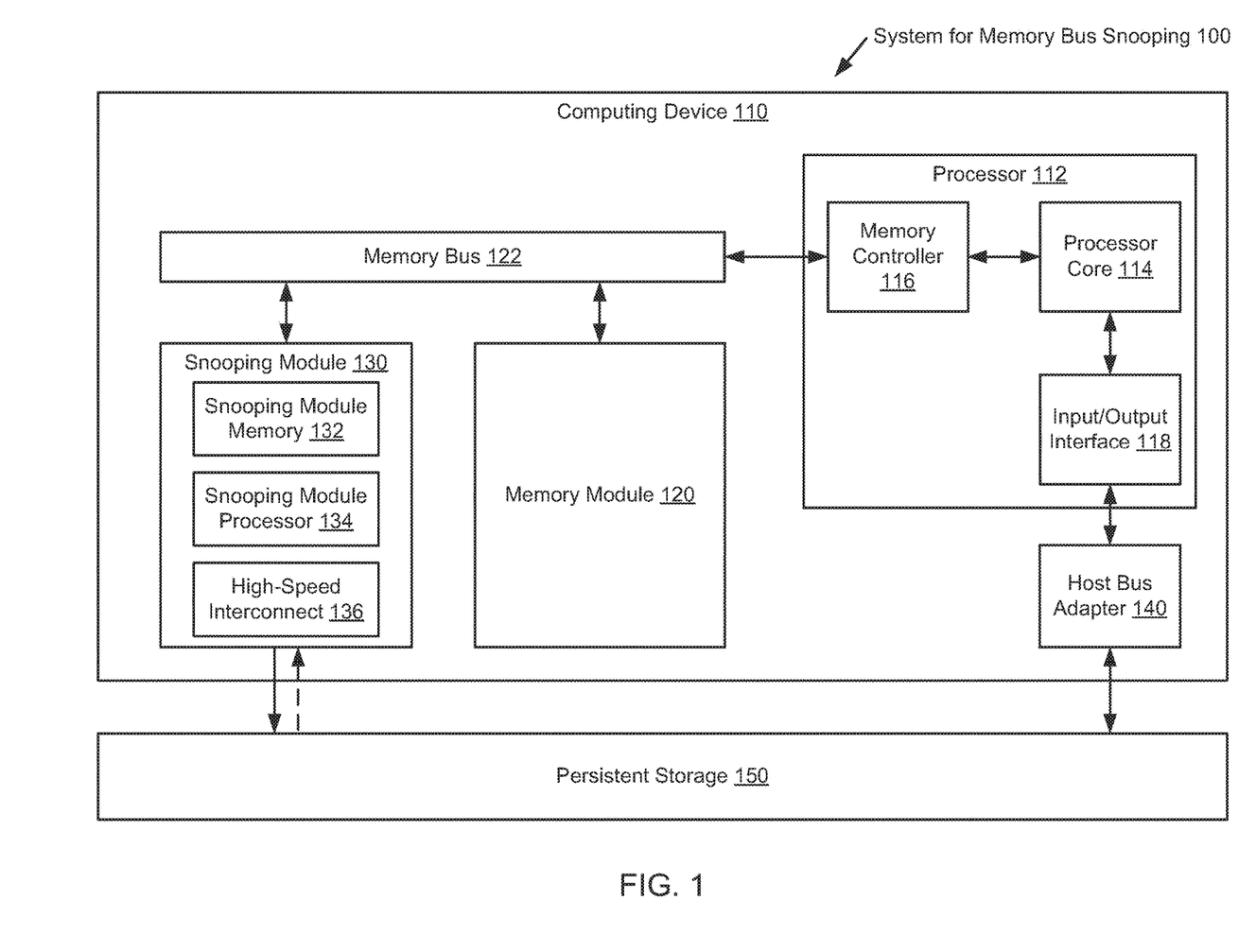
FIGS. 1 and 2 show systems, in accordance with one or more embodiments of the technology.

FIG. 1 shows a system for memory bus snooping in accordance with an embodiment of the technology. The system for memory bus snooping (100) may include a computing device (110), and a persistent storage (150).

The computing device (110) may be any type of server, desktop, embedded, or other computer hardware. The computing device may include at least one or more computer processor(s) (112), and a memory module (120) (e.g., random access memory (RAM), flash memory, etc.), interfacing with the computer processor(s) (112) via a memory bus (122). The computing device, in accordance with one or more embodiments of the technology, further includes a snooping module (130), functionally connected to the memory bus (122) in a manner, enabling the snooping module (130) to listen to communications sent, for example, by the processor (112) to the memory module (120). The snooping module, in accordance with an embodiment of the technology, interfaces with a persistent storage (150) that may be part of the computing device (110), or that alternatively may be located elsewhere. The computing device (110) may further include a host bus adapter (140) that provides an interface to the persistent storage (150). Each of these components is described below.

Those skilled in the art will recognize that a computing device may include components in addition to the above components, without departing from the technology. In particular, a computing device may include multiple memory modules, rather than a single memory module, as shown in FIG. 1. These memory modules may be connected to the same memory bus. A single snooping module may therefore be used in conjunction with these memory modules to capture data transactions from the CPU to the memory modules. Alternatively, a computing device may include multiple memory modules that interface with separate memory buses. In such a scenario, multiple separate snooping modules may be installed. In addition, a computing device may also include one or more storage device(s) (e.g., a hard disk, an optical drive such as a compact disk (CD) drive or digital versatile disk (DVD) drive, a flash memory stick, etc.), and numerous other elements and functionalities. The computing device may further include one or more output device(s) such as a screen (e.g., a liquid crystal display (LCD), a plasma display, touchscreen, cathode ray tube (CRT) monitor, projector, or other display device), and input device(s) (e.g., a keyboard and a mouse), thus enabling a user to interact with the computing device. The computing device may be connected to a network (e.g., a local area network (LAN), a wide area network (WAN) such as the Internet, mobile network, or any other type of network) via a network interface connection (not shown).

As previously noted, the computing device includes a processor. The processor (112) may be an integrated circuit for processing program instructions. The processor may be, for example, a central processing unit (CPU), a graphics processing unit (GPU), and application-specific integrated circuit (ASIC), a field-programmable gate array (FPGA), etc. The processor may include one or more processor cores (114), i.e., units that read and execute program instructions. The processor (112) may further be equipped with a memory controller (116) that provides an interface to the memory module (120). The memory controller may include the logic necessary to write and to read to/from the memory module (120) and to refresh the memory of the memory module, e.g., if the memory is dynamic random-access memory (DRAM). The memory controller (116) may be a component of the processor (112), or it may be a separate component, interfacing with the processor (112). The processor may further include an input/output (I/O) interface (118) that may allow connection of various communication buses, including, for example, a peripheral component interconnect express (PCIe) bus, but also a conventional peripheral component interconnect (PCI) bus, a universal serial bus (USB), etc. to the processor. Those skilled in the art will recognize that the I/O interface (118) may alternatively not be integrated in the processor (112), but may instead be implemented in one or more separate chips, interfacing with the processor (112). Further, parts of the I/O interface may be integrated in the processor, whereas other parts may be implemented elsewhere.

Continuing with the discussion of the computing device in FIG. 1, as previously noted, the computing device includes one or more memory modules. The memory module (120), in accordance with one or more embodiments of the technology, may include any type of volatile memory, but may alternatively also include various types of non-volatile memory. The memory module (120) may serve as random access memory (RAM) of the processor (112). The memory module (120) may thus include various forms of DRAM, e.g., single data rate (SDR) and double data rate (DDR) synchronous dynamic random-access memory (SDRAM) of various standards such as DDR1, DDR2, DDR3 and DDR4. The memory module (120) may be packaged in, for example, single in-line memory modules (SIMM) and/or in dual in-line memory modules (DIMM). The memory module (120) may alternatively or in addition also include solid state memory, including, for example, flash memory.

In one or more embodiments of the technology, the memory bus (122) functionally connects the memory module (120) to the memory controller (116), thus enabling the memory controller (116) to read/write from/to the memory module (120). Reading and writing may be performed via transmission of memory entries over the memory bus. A memory entry may be a set of data bits that may be transmitted over the memory bus in a single cycle. For a 64 bit-wide memory bus, a memory entry may include 64 bits. For a 72 bit-wide memory bus, a memory entry may include 72 bits, where 64 bits may represent data, and 8 bits may be used for error detection and correction. In one embodiment of the technology, a memory entry is a single addressable memory location, e.g., a byte. Alternatively, a memory entry may include a range of addressable memory locations. For example, a memory entry may include eight 64-bit memory locations to transfer 64-bytes that may form a cache line. The specifications of the memory bus may depend on the type of memory used in the computing device. The memory bus (122) may include data bus lines (not shown) and address bus lines (not shown). While the data bus lines (e.g., 64 or 72 bit-wide) may be used to convey the actual memory entries (i.e., data bits) to be transferred between the memory controller (116) of the processor (112) and the memory module (120), the address bus lines may be used by the memory controller of the processor to specify an address in the memory space of the memory module where a memory entry may be stored (i.e., the destination address of the memory entry, if a memory entry is written to the memory module, or the location of the memory entry in the memory module, if a memory entry is read from the memory module. The memory bus (122) may further include a chip select (CS) line (not shown) that the memory controller (116) may use to address the memory module. If multiple memory modules are installed, only the memory module(s) where CS is active is addressed by the memory controller (116). In addition, the memory bus (122) may also include one or more clock signals (not shown) that may be distributed to the components interfacing with the memory bus, e.g., the memory module(s).

The memory bus may include a set (for example, two, three or four) memory module sockets (e.g., SIMM and/or DIMM sockets) that allow the installation of memory modules. These memory module sockets may be functionally connected to the memory bus in parallel to one another. The memory module sockets may be installed on a motherboard (not shown) of the computing device.

As previously noted, the computing device (110), in accordance with one or more embodiments of the technology, includes the snooping module (130). In one or more embodiments of the technology, the snooping module (130) is installed, functionally in parallel to the memory module (120). The snooping module may be inserted, for example, into one of the memory module sockets on the motherboard of the computing device. The snooping module, in accordance with one or more embodiments of the technology, includes circuitry that is capable of performing memory bus snooping, i.e., the snooping module may be able to capture communications when, for example, the memory controller (116) transmits a memory entry to the memory module (120). A snooping module, in accordance with one or more embodiments of the technology, may include a snooping module memory (132), a snooping module processor (134) and a high-speed interconnect (136).

The snooping module memory (132) may temporarily store the snooped memory entry, obtained by the snooping module (130) from the memory bus (122). In one embodiment of the technology, the snooping module memory (132) is volatile memory, e.g., DRAM.

The snooping module memory (132) may directly receive a memory entry written to the memory module, for example, if the chip select (CS) signal, used by the memory controller (116) to address the memory module (120), is also distributed to the snooping module (130), thus addressing both the memory module (120) and the snooping module memory (132) as recipients of the memory entry. In one embodiment of the technology, the CS signal and the clock signal for the memory module are both also provided to the snooping module (130), i.e., they are shared CS and clock signals.

Alternatively, the snooping module (130), without necessarily receiving the CS signal, may monitor the memory bus (122) for memory entries being written to the memory module (120) by the memory controller (116). If the snooping module (130) detects writing of a memory entry to the memory module (120), a copy of the memory entry being written may be directed to the snooping module memory (132).

The snooping module memory (132) may also store a location stamp and a time stamp for each memory entry. A location stamp for a memory entry may be the destination address of the memory entry, specified by the memory controller (116) The snooping module (130) may obtain the destination address from the address bus lines when snooping the memory bus (122). A time stamp may be applied by the snooping module at the time when the memory entry is obtained by the snooping module. Location and time stamps may be used at a later time, for example, to restore the memory content of the memory module (120). Archived memory entries may be selected for memory restoration based on their time and location stamps. The time and location stamps allow, for example, the identification of archived memory entries for a particular memory region (as indicated by the location stamps), that were obtained at a particular time (as indicated by the time stamps).

In one or more embodiments of the technology, the snooping module memory (132) is smaller than the memory space of the memory module (120). While a memory module (120) may, for example, have 128 GB of memory, the snooping module (130) may only have, for example, 4 GB of memory. Accordingly, the address range, used by the memory controller (116) when addressing the memory module (120) may exceed the addressable snooping module memory (132). In embodiments of the technology where the snooping module memory (132) is functionally connected in parallel to the memory module (120), only the lower address bus lines within the address range of the snooping module memory (132) may connect to the snooping module memory, whereas the upper address bus lines of the memory bus (122) may not be connected to the snooping module memory (132). As a result, a memory entry, when entering the snooping module memory (132), may be remapped to a different memory location.

In an alternative embodiment of the technology where the snooping module memory is not directly connected functionally in parallel to the memory module, the memory entry may be assigned to any location in the snooping module memory (132). The snooping module processor (134) may coordinate the storage of a newly obtained memory entry in the snooping module memory (132).

The snooping module, in accordance with one or more embodiments of the technology, further includes a high-speed interconnect (136). The high-speed interconnect (136) may enable the snooping module to transfer a memory entry that was captured from the memory bus (122) and that is stored in the snooping module memory (132) to a receiving device, e.g., to the persistent storage (150). The associated time and location stamps may be transferred along with the memory entry.

The high-speed interconnect (136) may thus be a data transfer interface with a bandwidth that meets or exceeds the bandwidth of the memory module (120). Consider, for example, a configuration in which the snooping module (130) listens to the communication between the memory controller (116) and a DDR4 SDRAM DIMM with a 400 MHz memory clock. The I/O bus clock of the memory module (120) may be 1.6 GHz, with memory entries being transferred at both the rising and the falling edge of the clock. Accordingly, the DIMM may reach transfer rates of 3.2 GT/s. Each transfer may include 72 bits (64 bits of data plus 8 error-correcting code (ECC) bits), resulting in a transfer rate of 230.4 Gbit/s.

A high-speed interconnect with sufficient capacity may be based on multiple parallel data transfer interfaces. For example, a high-speed interconnect may include multiple fiber-optic interfaces such as 16 parallel 25 Gbit Ethernet lanes, providing a 400 Gbit/s capacity. Alternatively, eight parallel 50 Gbit Ethernet lanes may be used, or four wavelength-division multiplexing lanes, each operating at 100 Gbit/s (25 Gbit/s per wavelength) may be used, etc. Those skilled in the art will recognize that any type of interface with sufficient communication bandwidth and/or any type of communication protocol that includes semantics for writing data may be used. The high-speed interface is therefore not limited to Ethernet interfaces/protocols. Further, any type of physical communication medium, including copper and fiber-optic media may be used.

In one embodiment of the technology, the communication between the snooping module (130) and the persistent storage (150) is performed only in the direction from the snooping module to the persistent storage (solid arrow from snooping module to persistent storage). In an alternative embodiment of the technology, communication may also be possible in the opposite direction, i.e., from the persistent storage to the snooping module (dashed arrow from persistent storage to snooping module). This communication pathway may be used when the state of the memory module needs to be restored from memory entries archived in the persistent storage. The two communication pathways in opposite directions may be asymmetric in that, for example, the methods used for communication and the communication speeds differ, as described below with reference to FIGS. 3-6B.

Continuing with the discussion of the snooping module in FIG. 1, the snooping module in accordance with one or more embodiments of the technology, includes a snooping module processor. The snooping module processor (134) may perform various functions. The snooping module processor (134) may, for example, execute instructions for monitoring the memory bus (122) for communication activity, instructions that implement a data reduction filter, instructions that coordinate the transmission of memory entries by the snooping module memory via the high-speed interconnect (136), etc. These and additional functionalities are further described below with reference to FIGS. 3, 4 and 5A. The snooping module processor (134) may be any type of integrated circuit capable of performing these functions and/or at least some of the functions described below with reference to FIG. 3-6B. Accordingly, the snooping module processor (134) may be, for example, a central processing unit (CPU), and application-specific integrated circuit (ASIC), a field-programmable gate array (FPGA), etc.

Those skilled in the art will appreciate that the snooping module (130) is not limited to above described components. In one embodiment of the technology, the snooping module (130) also includes components enabling the snooping module to mimic a memory module. The snooping module (130) may include, for example, non-volatile storage (e.g., an electrically erasable programmable read-only memory (EEPROM)) that includes memory module information (including, for example, timing information, memory size information) and logic circuits enabling the snooping module to communicate with the memory controller (116). The snooping module may, for example, support the serial presence detect (SPD) protocol. During the boot process of the computing device (110), the snooping module (130) may thus register as a memory module with the memory controller (116), as further described below, with reference to FIG. 3.

In one embodiment of the technology, the components of the snooping module (120) are integrated in the memory module (130). Accordingly, in this case no stand-alone snooping module (130), as shown in FIG. 1, may be necessary.

In one embodiment of the technology, the computing device (110) further includes a host bus adapter (140) that is functionally connected to the I/O interface (118) of the processor (112). The host bus adapter (140) may provide an interface to the persistent storage (150) and may be, for example, a serial-attached SCSI (SAS), fiber channel, SCSI, SATA/eSATA, Ethernet, Infiniband or Fiber Channel controller, or any other type of fabric interconnect. The host bus adapter (140) may interface with the I/O interface (118) via, for example, the PCIe or PCI bus. In one embodiment of the technology, the host bus adapter (140) provides access to the persistent storage (150) using file system commands that enable reading and writing of content from/to the persistent storage.

The pathway from the persistent storage (150), via the host bus adapter (140), to the computing device (110) may be used for restoring memory entries that are archived in the persistent storage. The pathway may be an alternative to the previously described pathway from the persistent storage (150), via the high-speed interconnect (136), to the computing device (110). The pathway via the host bus adapter (140) may be essential, for example, if the high speed interconnect (136) is implemented as a one-way pathway where memory entries may only be sent from the snooping module (130) to the persistent storage (150), but not in the opposite direction.

Although both the host bus adapter (140) and the high-speed interconnect (136) interface the persistent storage (150) with the computing device (110), significant differences exist. While the high-speed interconnect (136) interfaces with the snooping module (130), the host bus adapter (140) interfaces with the I/O interface of the processor (118). Further, the high-speed interconnect (136) may have a bandwidth that is sufficient to carry the snooped data. Depending on the specific implementation, different bandwidth requirements may arise. For example, the high-speed interconnect bandwidth may need to be equal to or greater than the bandwidth of the memory module (120) if data is continuously snooped. Alternatively, less bandwidth may be sufficient if a buffer is used to temporarily cache data that is obtained from occasional snooping operations. The cached data may then be sent over time, thus requiring less high-speed interconnect bandwidth. In comparison, the host bus adapter (140) may provide a lower bandwidth as the transmission of data via the host bus adapter may not be time critical and may, in addition, be performed in increments. Further, the semantics of the high-speed interconnect may only require a limited command set, e.g. write commands allowing the pushing of memory entries from the snooping module memory to the persistent storage (and potentially in the opposite direction). In comparison, the host bus adapter, which may be a general purpose storage interface, may use more complex semantics that may include, for example, commands for reading and writing of data, and that may further include administrative commands, for example, for deleting data, formatting storage devices, etc.

Continuing with the discussion of the system for memory bus snooping (100), a persistent storage (150) may be used to store memory entries, snooped by the snooping module (130) and forwarded to the persistent storage (150) via the high-speed interconnect (136).

The persistent storage (150) may be any type of persistent (non-volatile) storage. The persistent storage (150) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the technology are not limited to aforementioned types of storage. For example, the persistent storage may include arrays of storage devices, rather than a single storage device. In one embodiment of the technology, one storage device is connected to one lane of the high-speed-interconnect. Accordingly, if the high-speed interconnect includes 16 lanes, an array of storage devices may include 16 storage devices.

In one embodiment of the technology, the persistent storage (150) is external to the computing device (150). Alternatively, the persistent storage may be located within the computing device (150). The persistent storage (150) may archive memory entries as needed, for example, to restore the content of the memory module (120) at a later time.

The persistent storage (150), in accordance with an embodiment of the technology, is connected to the snooping module (130) via the high speed interconnect (136). The persistent storage may further be connected to the host bus adapter (140) of the computing device (110) using, e.g., a SAS, fiber channel, SCSI or SATA/eSATA interface. Other interfaces suitable for the transmission of memory entries from the persistent storage (150) to the computing device (110) may be used in lieu of the interface via the host bus adapter (140). For example, a network connection, e.g. based on the Ethernet standard may alternatively be used to interface with a persistent storage operating as a network-attached storage (NAS) device.

The persistent storage (150) may be sized to accommodate a sufficient volume of data (i.e., memory entries and associated time and location stamps) obtained from the snooping module (130). If only the most recent memory transactions, obtained from the snooping module, are stored, a relatively small persistent storage may be sufficient. Such a persistent storage may be implemented analogous to a circular buffer, where the most recent addition of a memory entry, provided by the snooping module, overwrites the oldest memory entry in the persistent storage. This implementation may allow the restoration of a recent state of the memory module, for example, after a power failure. Further, if the persistent storage (150) is sized accordingly, a circular buffer-like implementation may also enable the storage of a history of memory entries. Alternatively, an appropriately sized persistent storage may enable the storage of data sent to the memory module data over longer periods of time, e.g. since the startup of the computing device.

In embodiments of the technology where multiple snooping modules (130) are used, for example, to capture data transfers from multiple memory busses (122), each of the snooping modules (130) may direct the snooped data to separate storage devices of the persistent storage (150). Alternatively, if bandwidth requirements are less stringent, multiple snooping modules may direct snooped data to the same storage devices of the persistent storage (150).

Figure 2:
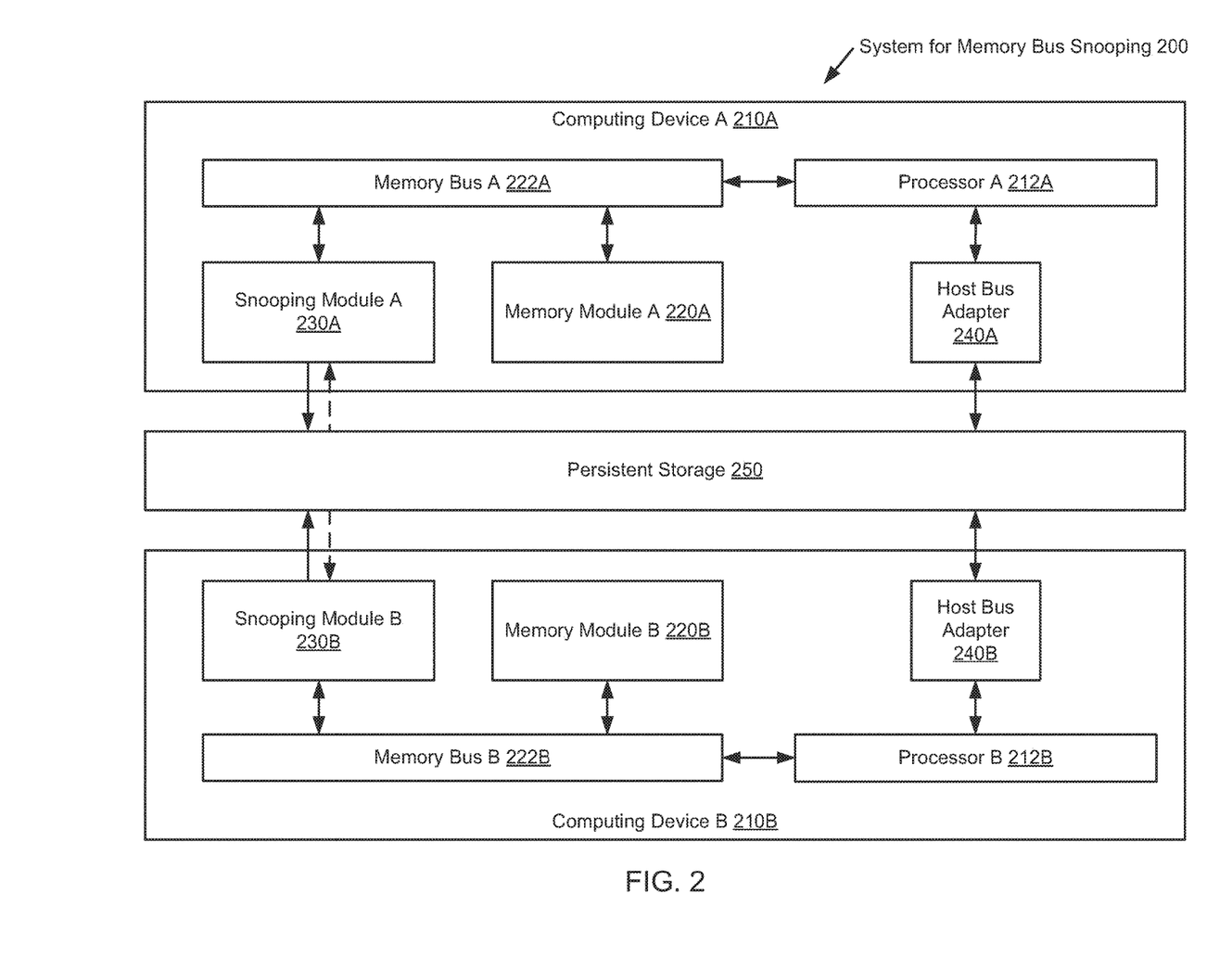

FIG. 2 shows an alternative embodiment of a system for memory bus snooping. The system for memory bus snooping (200) may include the components of the system for memory snooping (100), as previously described, with reference to FIG. 1. In addition, the system for memory bus snooping (200) may include a second computing device, similar to the previously described computing device (110). Accordingly, the system for memory bus snooping (200) includes computing devices A and B (210A, 210B). Both computing devices A and B (210A, 210B), in accordance with an embodiment of the technology, interface with the persistent storage (250), as previously described. The configuration shown in FIG. 2 may be used to synchronize the content of the memory modules A and B (220A, 220B) of computing devices A and B (210A, 210B), respectively. Both computing devices (210A, 210B) may transmit memory entries to the persistent storage (250). A comparison of the memory entries may reveal discrepancies between the memory entries provided by the computing devices (210A, 210B). The discrepancy detection may be performed per memory entry, or for batches of memory entries. Detected discrepancies may trigger the sending of memory entries to one or both computing devices (210A, 210B) to re-synchronize the memory content of the computing devices. The transmission of memory entries to and from the computing devices may be performed similar to the transmissions performed in the embodiment shown in FIG. 1. The details are described below, with reference to FIGS. 3-6B. Those skilled in the art will recognize that the technology is not limited to two computing devices interfacing with the persistent storage. Rather, any number of computing devices may participate in the above described memory synchronization via the persistent storage, without departing from the technology.

In an alternative embodiment of the technology, the snooping modules A and B (230A, 230B) may be directly interconnected without an intermediary persistent storage (250). In this case, the receiving device, connected to the snooping module of one computing device, is another snooping module. Such an implementation may be used, for example, for near-real-time synchronization of the content of the memory modules A and B (220A, 220B). The entire content of the memory module, or contiguous or non-contiguous memory areas of the memory modules A and B (2220A, 220B) may be synchronized as further described below, with reference to FIGS. 3, 5 and 6A. In one embodiment of the technology, the above described direct memory to memory synchronization is used to implement a processor-to-processor communication. The processor-to-processor communication may be based on updating pre-specified memory locations. Each participating processor may write into a specified, separate memory location of another participating processor's snooping module. All processors may monitor these memory locations for new memory entries having been written by another processor, for example by regularly polling the memory location. If a new memory entry is detected, the processor may retrieve the memory entry. In one embodiment of the technology, the retrieved memory entry includes an address referring to another memory location in the snooping module memory, where, for example, data to be retrieved may have been placed by the snooping module of another processor. The processor may then retrieve the data from the snooping module memory.

One skilled in the art will recognize that the architecture of a system for memory bus snooping is not limited to the components shown in FIGS. 1 and 2. For example, computing devices may include additional components not shown in FIGS. 1 and 2. A computing device may, for example, include multiple processors, multiple memory buses, multiple snooping modules and various combinations thereof, without departing from the technology. In addition, various implementations of the persistent storage may exist. The implementation of the persistent storage is neither limited by the type of storage nor by the number of storage devices, the interface(s) used to connect the persistent storage to a computing device, etc.

FIGS. 3-6B show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel. In one embodiment of the technology, the steps shown in FIGS. 3-6B may be performed in parallel with any other steps shown in FIGS. 3-6B without departing from the technology.

Figure 3:
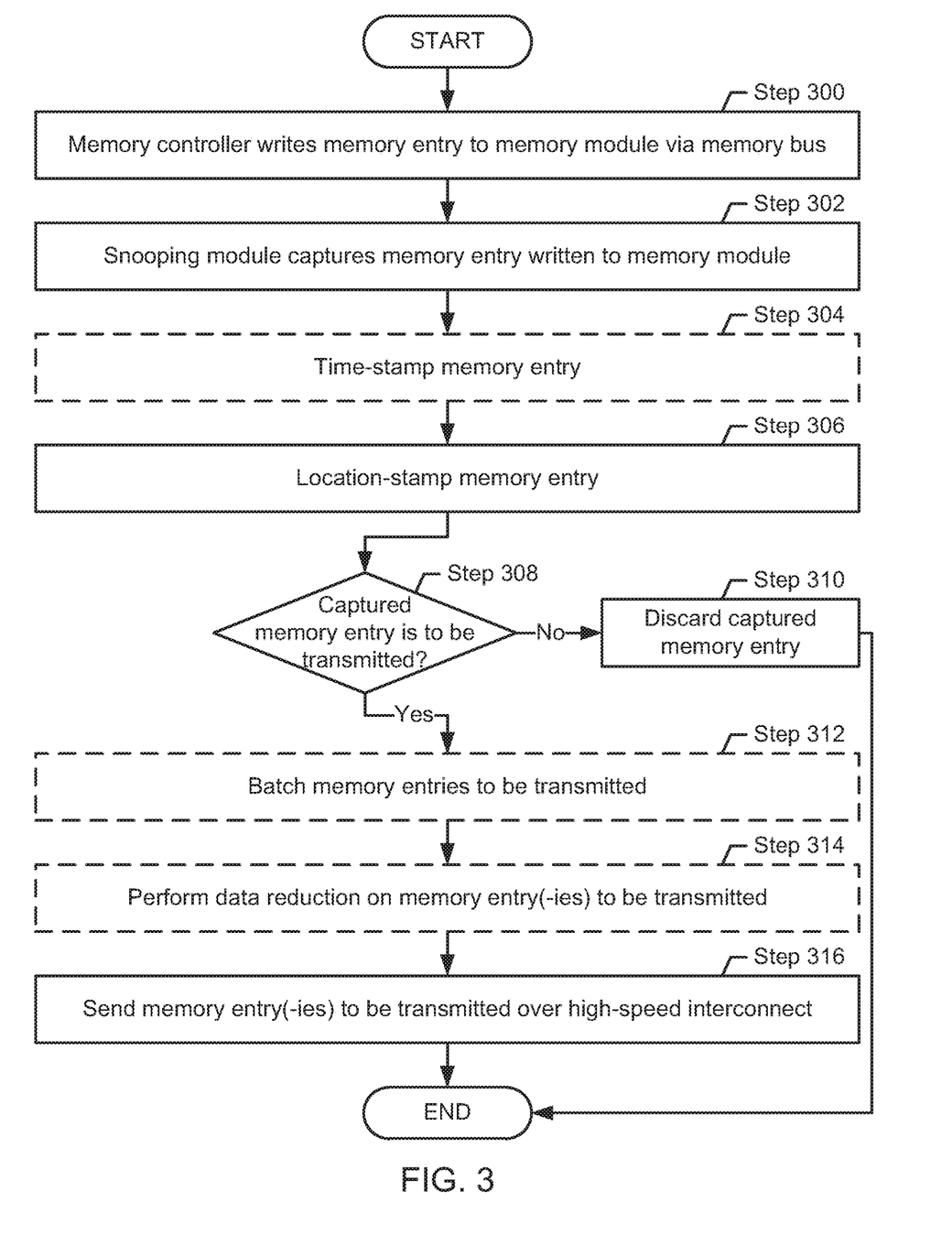

FIG. 3 shows a method for capturing and transmitting a memory entry, obtained from a memory bus connecting a memory controller to a memory module. As previously described, a memory entry may be a set of bits being transmitted over a memory bus in a single cycle, for example, from a memory controller to a memory module. A memory entry may include, for example, 64 or 72 bits and may further be accompanied by a destination address that defines the intended destination of the memory entry in the memory module. The method shown in FIG. 3 may be executed each time a memory entry is transferred from the memory controller to the memory module. Although the method is described based on a configuration that includes a single memory module, those skilled in the art will appreciate that the method is equally applicable to configurations with multiple memory modules connected to the memory bus.

Prior to the execution of the method shown in FIG. 3 (and of the methods shown in FIGS. 4-6B), the computing device, equipped with the memory module and the snooping module, may perform a boot process. The boot process may include the detection of the memory module and of the snooping module by the memory controller. The detection allows the memory controller to determine the size of the memory module and the timing required by the memory module, among other critical and/or optional parameters.

As the memory controller, during the boot process, queries components on the memory bus, the memory controller may also query the snooping module for parameters. The snooping module, upon request, may return pre-programmed parameters that may be permanently stored in a non-volatile storage of the snooping module, e.g., in an EEPROM. A parameter set may be stored in the EEPROM, for example, as serial presence detect (SPD) data. In one embodiment of the technology, the parameter set stored in the non-volatile memory is set to match the parameter set of the memory module. For example, size and timing information may match, such that the memory controller may configure the memory bus for optimal performance with the memory module. The snooping module may thus mimic a memory module with characteristics similar to the characteristics of the actual memory module, even though differences exist between the memory module and the snooping module. The memory module may, for example, have a significantly larger memory than the snooping module. Consider, for example, a scenario where a computing device is equipped with a 128 GB memory module and with a snooping module that has only 4 GB of memory. The snooping module, when queried by the memory controller may report 128 GB of memory, even though it is equipped with only 4 GB of memory.

Because the memory controller, in accordance with an embodiment of the technology, recognizes the snooping module as a memory module, additional steps may need to be taken to prevent the computing device from erroneously treating the snooping module as a memory module. For example, the basic input/output system (BIOS) of the computing system may be configured to mark the memory region, assigned to the snooping module as non-accessible. Alternatively, the kernel of the operating system may, for example, blacklist this memory region or mark it as reserved.

After completion of the above described boot process, the computing device may use all memory of the memory module, while not attempting to access the memory region assigned to the snooping module.

In one embodiment of the technology, the computing device is further configured to allow the memory controller to access the snooping module to perform snooping module-specific operations. The memory controller may, for example, access the snooping module to restore memory module entries, as described below with reference to FIG. 6A.

In an alternative embodiment of the technology, the snooping module may be invisible to the memory controller. Accordingly, after completion of the boot process, the memory controller of the computing device may only access the memory module, while being unaware of the presence of the snooping module. The memory controller may thus be unable to access the snooping module.

After successful detection of the memory module and potentially the snooping module, the computing device may boot an operating system and may begin to perform regularly. Execution of the method described in FIG. 3 may begin.

Turning to FIG. 3, in Step 300, the memory controller writes a memory entry to the memory module via the memory bus. As previously discussed, a memory entry may be a single transmission of, for example, 64 or 72 bits of data on the data bus lines of the memory bus. The memory entry may be accompanied by a destination address, transmitted on the address bus lines of the memory bus, that specifies the memory location in the memory module, where the memory entry is to be stored.

In Step 302, the snooping module captures the memory entry, written to the memory module by the memory controller in Step 300.

In one embodiment of the technology, the snooping module receives the chip select (CS) signal that is directed to the memory module. A copy of the memory entry may thus be directly written into the snooping module memory, at the location specified by the destination address, or at a remapped address, if the snooping module memory is smaller than the memory module.

As previously noted, upper address lines, representing addresses beyond the capacity of the snooping module memory, may not be connected to the snooping module memory. As a result, remapping may occur if the memory controller writes to memory beyond the snooping module memory's capacity. Consider, for example, a hypothetical scenario in which the snooping module is equipped with 4 GB of memory. If the memory controller directs a memory entry to the memory module, specifying a destination address in a memory module region below 4 GB, a copy of the memory entry may be written to the snooping module memory at the destination address. If the memory controller directs a memory entry to the memory module, specifying a destination address between 4 GB and 8 GB, the snooping module memory will receive the memory entry at the destination address minus 4 GB, due to the non-connected upper address lines. Similarly, if the destination address is located between 8 GB and 12 GB, the snooping module memory will receive the memory entry at the destination address minus 8 GB, etc.

In an alternative embodiment where the snooping module memory is not directly functionally connected the snooping module (e.g., because the distribution of the CS signal is configured such that only the memory module receives the CS signal), the memory entry may not be automatically written into the snooping module memory. Instead, the snooping module may monitor the memory bus for memory entries being written to the memory module. If the snooping module detects the writing of a memory entry to the memory module, the snooping module may capture the memory entry off of the memory bus and may generate a copy of the memory entry being written to the memory module. The copy may be stored in any location of the snooping module memory, i.e., the storage location of the copy may not necessarily correspond to the destination address of the memory entry being written to the memory module.

In Step 304, the memory entry, captured in Step 302, is time-stamped. The time stamp may be stored in the snooping module memory, along with the memory entry. Time-stamping, in accordance with an embodiment of the technology, is performed using timing information from a globally valid time source, i.e., a time source that is also available to other snooping modules in the computing system, if multiple snooping modules are installed. Time-stamping using a common time source may allow to establish a temporal relationship of memory entries, regardless of where (i.e., by which snooping module) the memory entries were captured. This may be relevant, for example, if, at a later time, the computing device's memory needs to be restored. In this case, a memory state at a particular time may be restored based on common time stamp data of multiple memory entries. For example, the latest memory state may be restored by selecting memory entries with the most recent associated time stamps for restoration. Step 304 is optional and may primarily be used when memory entries are archived. Time stamps in this case may allow, for example, the distinction of a more recent memory entry from an older memory entry, for the same memory location. A time stamp may not be necessary, for example, if a memory entry is directed to another snooping module, e.g., for the purpose of CPU-to-CPU communication.

In Step 306, the memory entry, captured in Step 302, is location-stamped. Location-stamping, in accordance with an embodiment of the technology, is performed by reading the destination address of the memory entry from the address bus lines. All address bus lines may be read, thus providing the complete destination address for the memory entry in the memory module. The location stamp may be stored in the snooping module memory, along with the memory entry and the time stamp.

In Step 308, a determination is made about whether the memory entry is to be transmitted, e.g., to a persistent storage. The determination may be made by a data reduction filter. Various criteria may be considered by the data reduction filter. If, for example, the snooping module is configured to transmit only memory entries directed to a specific area or areas of the memory module, any memory entry with a destination address that does not fall into the specified memory area(s) may be discarded. If a determination is made that the memory entry is not to be transmitted, the method may proceed to Step 310. Alternatively, if a determination is made that the captured memory entry is to be transmitted, the method may proceed to Step 312.

In Step 310, the memory entry is discarded. The execution of the method shown in FIG. 3 is terminated for the memory entry being processed.

In Step 312, memory entries to be transmitted are batched, i.e., a set of memory entries may be accumulated prior to execution of the subsequent steps. Availability of a set of memory entries rather than a single memory entry may enable, for example, data reduction techniques, described in Step 314. If batching is performed, the execution of the subsequent steps may be deferred, until a batch of sufficient size is available. Step 312 is optional, i.e., alternatively an individual memory entry rather than a batch may be processed in the subsequent steps.

In Step 314, a data reduction is performed on memory entries to be transmitted. Various data reduction methods may be employed. For example, if a data entry includes error correcting code, the error correcting code may be removed. This may, for example, shorten a 72 bit data entry to 64 bits. In addition or alternatively, lossless compression algorithms may be used on individual memory entries or batches of memory entries to reduce the data volume. Step 314 is optional, i.e., alternatively, the original memory entries may be processed in the subsequent steps.

If above described Steps 308 and 314 result in a persistent reduction of the data volume to be transmitted, the high-speed interconnect may be selected to have a data transmitting capacity below the memory module bandwidth without overloading the high-speed interconnect.

In Step 316, the snooping module sends the memory entry(-ies), including destination address and time stamp data to a receiving device via a high-speed interconnect. The receiving device may be, for example, a persistent storage, where memory entries may be archived, or it may be another snooping module, for example, in a second computing device.

As previously discussed, the high-speed interconnect may include multiple parallel data transfer interfaces such as multiple fiber-optic interfaces. To benefit from the parallel data interfaces of the high-speed interconnect for the purpose of transmitting a memory entry, the memory entry may be segmented into memory entry fragments. The memory entry fragments may then be distributed substantially equally over the parallel data interfaces for sending the memory entry fragments. Consider, for example a scenario where eight parallel fiber-optic interfaces form the high-speed interconnect. To transfer, for example, a 64 bit memory entry, the memory entry may be segmented into eight 8-bit fragments, with each fragment being sent via one of the eight parallel fiber-optic interfaces. Those skilled in the art will recognize that various forms of load-balancing may be used to benefit from the parallel data interfaces of the high-speed interconnect. For example, time-stamp and/or location-stamp data may also be segmented prior to transmitting them via the parallel data interfaces of the high-speed interconnect.

The sending may be performed immediately or upon a trigger-event, such as, for example, reaching a specified percentage of the snooping module memory being occupied by memory entries to be sent. Accordingly, either a single memory entry or a number of memory entries may be sent.

Figure 4:
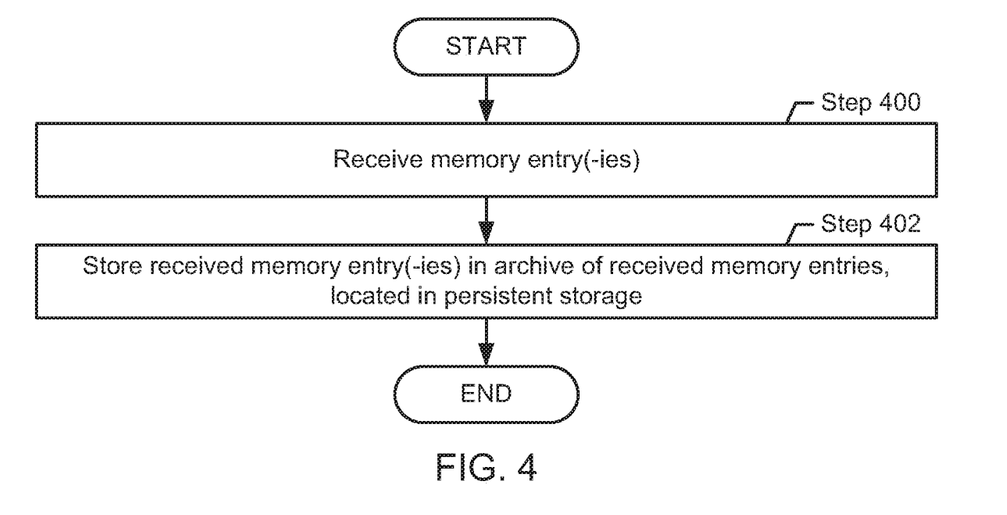

FIG. 4 shows a method for archiving a memory entry, received by a persistent storage from the snooping module via the high-speed interconnect. The method shown in FIG. 4 may be executed each time a memory entry is delivered to the persistent storage via the high-speed interconnect.

Turning to FIG. 4, in Step 400, the persistent storage receives one or more memory entries, along with the associated time and location stamps via the high-speed interconnect.

In Step 402, the received memory entry(-ies) is/are stored in an archive of received memory entries, located in the persistent storage. Each of the parallel data interfaces of the high-speed interconnect may directly interface with a dedicated storage device, where a received memory entry fragment may be stored. In one embodiment of the technology, the persistent storage consolidates the received memory entry fragments, time-stamp and location-stamp data to ensure that the correspondence between memory entry fragments, time-stamp and location-stamp information of a memory entry is maintained. Consolidation may be accomplished by copying or moving all received elements, associated with a particular memory entry, into a single location, or alternatively by documenting the location of the received elements, associated with the memory entry, e.g. in a database.

Figure 5:
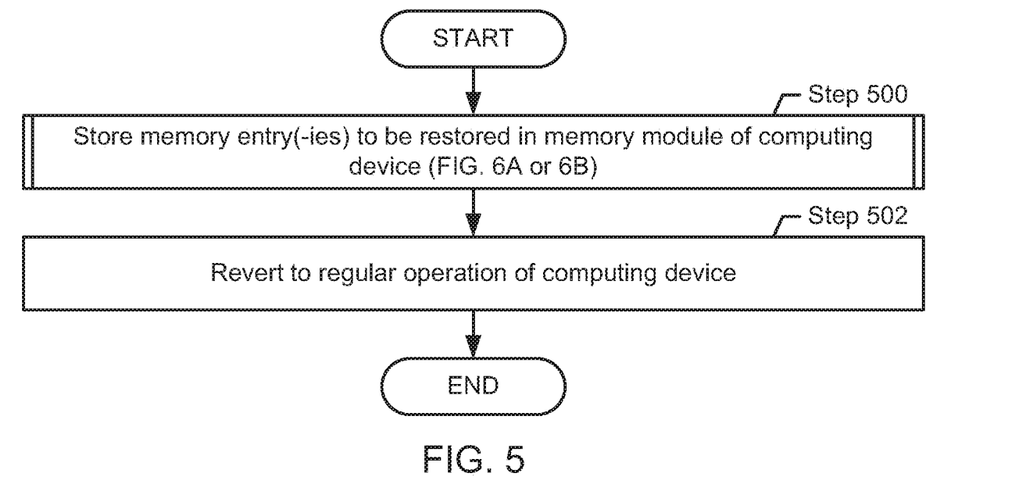

FIG. 5 shows a method for restoring the memory state of a computing device from memory entries previously stored in the persistent storage. The method shown in FIG. 5 may be executed whenever restoration of a previous memory state, i.e., of the entire memory of a memory module or contiguous or non-contiguous areas of memory in the memory module is desired. FIG. 5 may also be executed when memory of a second computing device is to be synchronized with memory of a first computing device, via the persistent storage.

Turning to FIG. 5, in Step 500, memory entries to be restored from the persistent storage are stored in the memory module of the computing device. If the high-speed interconnect between the snooping module and the persistent storage supports bidirectional communication, the memory entries to be restored may be transmitted to the computing device via the high speed interconnect. This method is described in detail in FIG. 6A. Alternatively, the memory entries to be restored may be transmitted to the computing device via the persistent storage's interface with the host bus adapter of the computing device. This method is described in detail in FIG. 6B. If the computing device includes multiple memory modules, Step 602 may be performed for each of these modules.

In Step 502, the computing device may revert to regular operation. After the memory state of all memory modules of the computing device has been restored, as described in Step 502, the processor of the computing device may begin to operate on the updated memory state of the memory module(s).

Figure 6A:
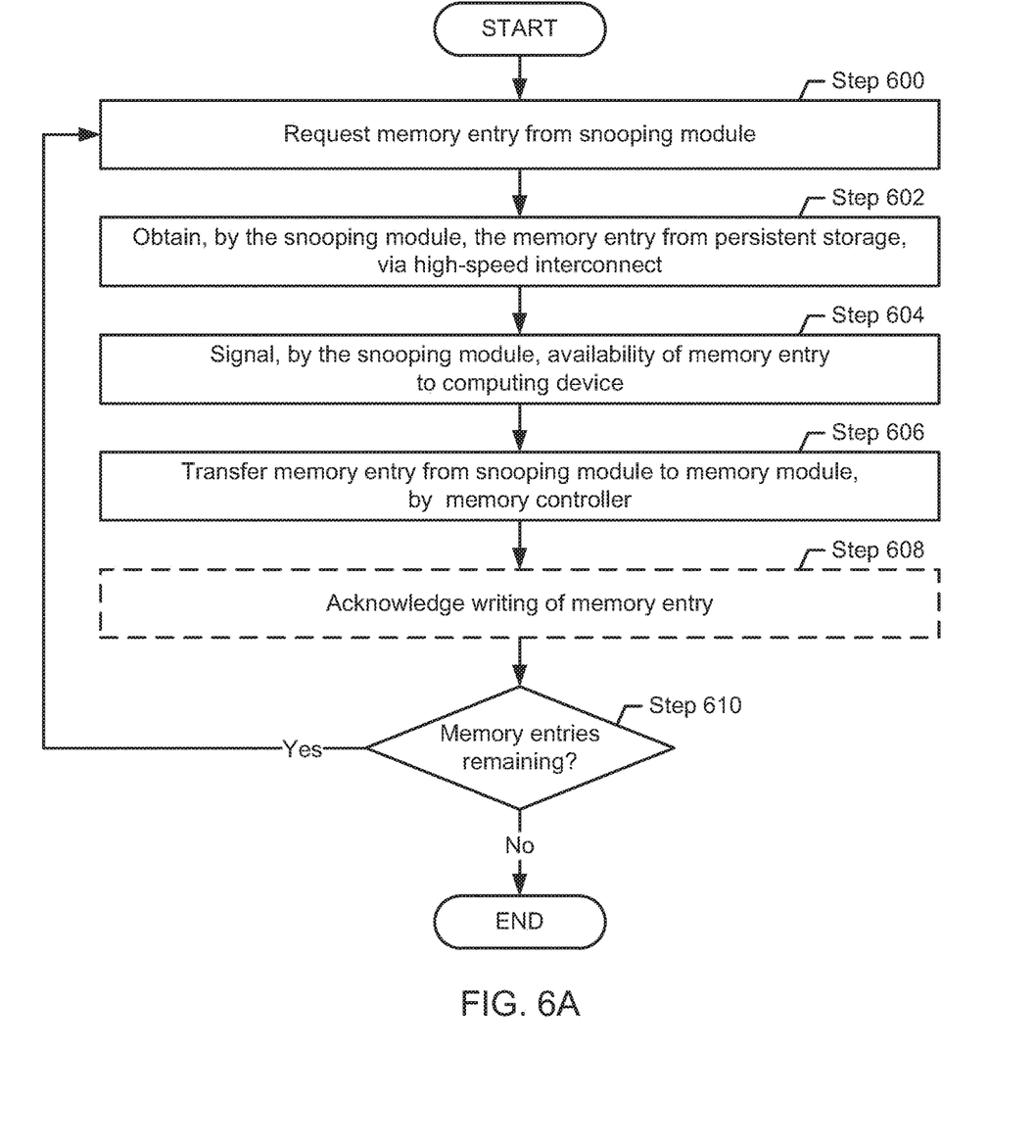

FIG. 6A shows a method for transmitting memory entries from the persistent storage to the computing device via the high-speed interconnect of the snooping module.

Turning to FIG. 6A, in Step 600, a request to provide a particular memory entry is addressed to the snooping module. The request may originate from the processor of the computing device. In one embodiment of the technology, the processor may formulate repeated requests, in order to obtain memory entries for a particular memory region, for multiple memory regions, or for the entire memory module. Accordingly, a request may include the specification of a particular memory module destination address.

In Step 602, in accordance with an embodiment of the technology, the memory entry is obtained from the persistent storage via the high-speed interconnect, in response to the request made in Step 600. More specifically, the high-speed interconnect may forward the request, made in Step 600, to the persistent storage where the matching memory entry may be identified.

In a first scenario, where the memory state of a memory module in a computing device is to be restored, for example, to recover the memory state after an error, the persistent storage, upon receipt of the request, may select the matching entry based on the memory module destination address, specified in the request. The appropriate memory entry is the memory entry with a matching location stamp.

If multiple memory entries with the same location stamp exist in the persistent storage, for example, because a history of memory entries was archived over time, the matching memory entry may be identified by further considering time-stamp information. For example, if the latest state of the computing device's memory module is to be restored, the memory entry with the latest associated time stamp may be selected based on time-stamp information of the memory entries stored in the persistent storage.

In a second scenario where the memory state of a computing device is to be updated because the memory state of the computing device deviates from the memory state of another computing device, the memory entry to be transmitted may be the deviating memory entry. Upon detection of a deviation of memory states, a deviation resolution may be performed to distinguish the correct memory entry from the corrupted memory entry, and further to identify the computing device with the corrupt memory entry. An identified correct memory entry may then be provided to the snooping module of the computing device with the corrupted memory entry. In such a configuration, the receiving snooping module may receive the memory entry without previously requesting the memory entry (i.e., without execution of Step 600).

In an alternative embodiment of the technology, where a snooping module is directly connected to a second snooping module via a high-speed interconnect, the receiving snooping module may receive a memory entry from the sending snooping module. The sending snooping module may, for example, write the memory entry directly into the snooping module memory of the receiving snooping module. In such a configuration, the receiving snooping module may receive the memory entry without previously requesting the memory entry (i.e., without execution of Step 600).

As previously discussed, memory entry fragments, forming a memory entry, may be distributed over multiple storage devices. Accordingly, the identification of a memory entry may also include the identification of the memory fragments that form the memory entries.

The selected memory entry, including all memory fragments forming the memory entry, may be provided to the snooping module via the high-speed interconnect and may be stored in the snooping module memory.

In Step 604, the snooping module, having received the memory entry, signals availability of the memory entry to the computing device. In one embodiment of the technology, the processor, interfacing with the snooping module via the memory controller and the memory bus is notified. In one embodiment of the technology, the snooping module memory includes flags used for indicating availability of memory entries that have been requested by the processor in Step 600. After receipt of the memory entry in Step 602, such a flag may be set to indicate availability of the memory entry. In one embodiment of the technology, the processor polls the snooping module memory for the flag, for example, at regular intervals. The processor may thus recognize availability of the memory entry, based on the setting of the flag.

In Step 606, the processor of the computing device, after having detected availability of the memory entry in the snooping module memory, orchestrates the transfer of the memory entry in the snooping module memory to the memory module. The transfer may be performed by the memory controller, which interfaces with both the snooping module and the memory module, via the memory bus. After the completed transfer, the memory module includes the memory entry at the intended location in memory space.

In Step 608, the writing of the memory entry into the memory module may be acknowledged to the persistent storage. The writing may be acknowledged, for example, by the snooping module returning the memory entry, having been successfully written to the memory module, to the persistent storage, e.g., via the high-speed interconnect. The acknowledgement may be used to determine, for example, whether the next memory entry may be sent by the persistent storage, as described below, or whether the current memory entry may need to be re-sent. Rather than returning the memory entry, the snooping module may alternatively return a hash, derived from the memory entry that has been written to the memory module, or any other form of acknowledgement accepted by the persistent storage.

Those skilled in the art will appreciate that even though the above description of Steps 600-608 discusses the transmission of a single memory entry, alternatively, multiple memory entries, forming consecutive or non-consecutive memory areas may be transmitted using substantially the same steps.

In Step 610, a determination is made about whether additional memory entries to be written to the memory module remain. Multiple memory entries may require transfer to the memory module if one or more memory regions of the memory module, or the entire memory module is restored. If a determination is made that memory entries to be written to the memory module remain, the method may return to Step 600. Alternatively, if no memory entries to be written to the memory module remain, the method may terminate.

Figure 6B:
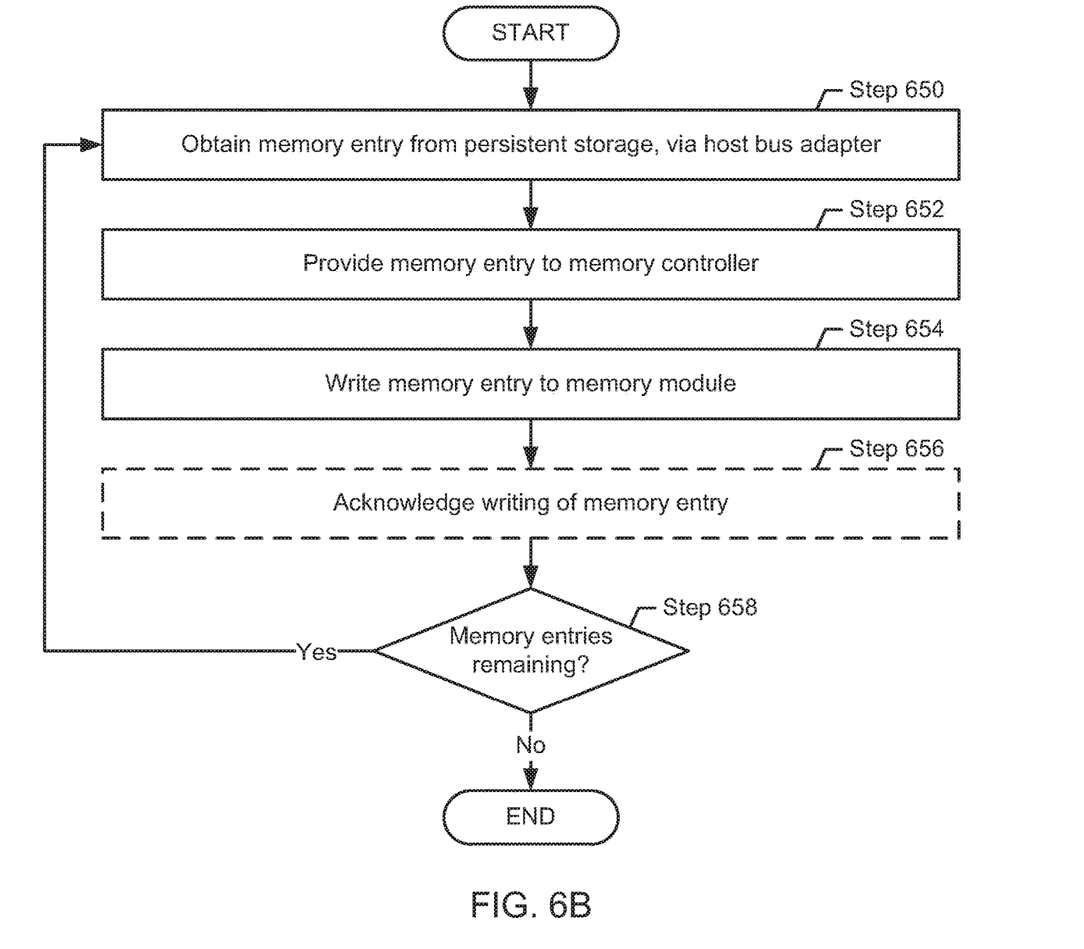

FIG. 6B shows a method for transmitting memory entries from the persistent storage to the computing device via the host bus adapter. Turning to FIG. 6B, in Step 650, the computing device obtains a memory entry from the persistent storage. The computing device may use file system commands, compatible with the file system of the persistent storage to locate the memory entries in the persistent storage, to identify a desired memory entry, and to retrieve the identified entry. A desired memory entry may be for example, a memory entry where the associated location stamp matches a memory module destination address, specified by the processor. The retrieval may be performed via the host bus adapter.

In Step 652, a memory entry is provided to the memory controller. The memory entry that is provided to the memory controller, in accordance with an embodiment of the technology, is selected as described in Step 602 of the method shown in FIG. 6A. In one embodiment of the technology, the host bus adapter signals availability of the memory entry to the processor via the I/O interface of the processor. The processor, in response, may orchestrate a direct memory access (DMA) transfer of the memory entry to the memory controller. Alternatively, the processor itself may handle the transfer of the memory entry from the I/O interface to the memory controller.

In Step 654, the memory entry is written to the appropriate location in the memory module, by the memory controller. After the completed transfer, the memory module includes the memory entry at the intended location in memory space.

In Step 656, the writing of the memory entry into the memory module may be acknowledged to the persistent storage. The writing may be acknowledged, for example, by the snooping module returning the memory entry, having been successfully written to the memory module, to the persistent storage, e.g., via the high-speed interconnect. Accordingly, the snooping module may also be capturing memory entries being written to the memory module, as previously described in Step 302, during the transfer of memory entries from the persistent storage to the computing device. The acknowledgement may be used to determine, for example, whether the next memory entry may be sent by the persistent storage, as described below, or whether the current memory entry may need to be re-sent. Rather than returning the memory entry, the snooping module may alternatively return a hash, derived from the memory entry that has been written to the memory module, or any other form of acknowledgement accepted by the persistent storage.

Those skilled in the art will appreciate that even though the above description of Steps 650-656 discusses the transmission of a single memory entry, alternatively, multiple memory entries, forming consecutive or non-consecutive memory areas may be transmitted using substantially the same steps.

In Step 658, a determination is made about whether additional memory entries to be written to the memory module remain. Multiple memory entries may require transfer to the memory module if one or more memory regions of the memory module, or the entire memory module is restored. If a determination is made that memory entries to be written to the memory module remain, the method may return to Step 650. Alternatively, if no memory entries to be written to the memory module remain, the method may terminate.

Embodiments of the technology may enable the readout of memory entries from a memory module of a computing device in near-real-time, e.g., by providing a high transfer rate and a low latency. Asymmetric memory transceivers, in accordance with one or more embodiments of the technology include one or more snooping modules that may perform this readout during regular operation of the computing device. More specifically, the readout does not require additional CPU and/or memory clock cycles that would slow down the operation of the computing device.

Memory entries obtained by a snooping module may be archived and may later be written back to the memory module, if desired. Time-stamping and location-stamping ensures that the origin of a memory entry is always known and thus can restored at a later time. Alternatively, snooping modules, in accordance with one or more embodiments of the technology, may also be used to implement a real-time or near-real-time solution for the exchange of memory entries between different memory modules.

The following applications may benefit from the real-time asymmetric memory transceiver: (i) Any computing system where volatile memory that includes important data may become unavailable, e.g. due to power failures, memory failures or other hardware failures. Using the asymmetric memory transceiver, the volatile memory may be restored at any time. A similar implementation may also be used in a computing system hibernation solution. The hibernation solution would allow the computing system to be powered off at any time, without any delay, while allowing to restore the last memory state when desired. (ii) Any computing system where the ability to restore a complete or partial past state of the computing device's memory (or a series of states, allowing the tracking of the computing device's memory over time) is desirable, e.g. for debugging purposes or in high-security environments. If the asymmetric memory transceiver is used to continuously record memory entries, memory states for specified points in time may be regenerated (iii) Any computing system where nonvolatile storage should be accessible even during failures of hardware, power outages, etc. Using the asymmetric memory transceiver, the content of the nonvolatile storage may be accessed elsewhere, while the nonvolatile storage itself is not accessible. (iv) Any computing system, where high-speed sharing of memory entries is desirable. A first snooping module may be used, for example to read memory entries from a first memory module, while a second snooping module may write the memory entries to a second memory module. The asymmetric memory transceiver may thus be used to synchronize memory, e.g., between different computing devices or between memory modules connected to different memory busses in the same computing device.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A system, comprising:
a processor that stores data in a memory module, wherein the processor is operably connected to the memory module via a first input-output interface;
a persistent storage operably connected to the processor via a second input-output interface; and
a snooping module, operably connected to the first input-output interface of the processor, configured to:
snoop the data being stored in the memory module by the processor via the first input-output interface to obtain snooped data;
store a copy of the snooped data in the persistent storage;
after storing the copy of the snooped data:
instruct the processor to obtain the copy of the snooped data via the second input-output interface after a failure of the memory module resulting in a loss of the data; and
instruct the processor to load the copy of the snooped data into the memory module after the loss of the data,
wherein the snooping module is not operably connected to the second input-output interface, and
wherein the snooping module is asymmetric with respect to a first ability to read the snooped data and a second ability to write the snooped data.

2. The system of claim 1, wherein the first input-output interface is a memory bus.

3. The system of claim 1, wherein the second input-output interface is a host bus adapter.

4. The system of claim 1, wherein the copy of the snooped data obtained via the second input-output interface is routed to the memory module through the processor.

5. The system of claim 1, wherein the copy of the snooped data obtained via the second input-output interface is routed to the memory module through the first input-output interface.

6. The system of claim 1, wherein the snooping module is further configured to:
snoop the copy of the snooped data while the processor loads the copy of the snooped data into the memory module.

7. The system of claim 6, wherein the snooping module is further configured to:
automatically instruct the processor to obtain a copy of second snooped data via the second input-output interface in response to snooping the copy of the snooped data.

8. The system of claim 1, wherein the loss of the data is due to a power outage to the memory module.

9. The system of claim 1, wherein the first ability to read is greater than the second ability to write.

10. A method, comprising:
snooping data being stored in a memory module by a processor via a first input-output interface between the processor and the memory module to obtain snooped data;
storing a copy of the snooped data in a persistent storage operably connected to the processor by a second input-output interface;
after storing the copy of the snooped data:
instructing, by a snooping module, the processor to obtain the copy of the snooped data via the second input-output interface after a failure of the memory module resulting in a loss of the data; and
instructing, by the snooping module, the processor to load the copy of the snooped data into the memory module after the loss of the data,
wherein the snooping module is not operably connected to the second input-output interface, and
wherein the snooping module is asymmetric with respect to a first ability to read the snooped data and a second ability to write the snooped data.

11. The method of claim 10, wherein the first input-output interface is a memory bus.

12. The method of claim 10, wherein the second input-output interface is a host bus adapter.

13. The method of claim 10, wherein the copy of the snooped data obtained via the second input-output interface is routed to the memory module through the processor.

14. The method of claim 10, wherein the copy of the snooped data obtained via the second input-output interface is routed to the memory module through the first input-output interface.

15. The method of claim 10, further comprising snooping the copy of the snooped data while the processor loads the copy of the snooped data into the memory module.

16. The method of claim 15, further comprising automatically instructing the processor to obtain a copy of second snooped data via the second input-output interface after snooping the copy of the snooped data.

17. The method of claim 10, wherein the loss of the data is due to a power outage to the memory module.

18. The method of claim 10, wherein the first ability to read is greater than the second ability to write.

19. A method, comprising:
snooping data being stored in a memory module by a processor via a first input-output interface between the processor and the memory module to obtain snooped data;
storing a copy of the snooped data in a persistent storage operably connected to the processor by a second input-output interface;
after storing the copy of the snooped data:
instructing, by a snooping module, the processor to obtain the copy of the snooped data via the second input-output interface after a failure of the memory module resulting in loss of the data, wherein the snooping module is not operably connected to the second input-output interface; and
instructing, by the snooping module, the processor to load the copy of the snooped data into the memory module after the loss of the data;
snooping the copy of the snooped data while the processor loads the copy of the snooped data into the memory module; and
automatically instructing the processor to obtain a copy of second snooped data via the second input-output interface after snooping the copy of the snooped data.

* * * * *